US012548457B2

(12) United States Patent
Torres et al.

(10) Patent No.: US 12,548,457 B2
(45) Date of Patent: Feb. 10, 2026

(54) METHOD AND ARRANGEMENT FOR ASSISTED EXECUTION OF AN ACTIVITY

(71) Applicant: Telefonaktiebolaget LM Ericsson (publ), Stockholm (SE)

(72) Inventors: Florent Torres, Malmö (SE); Sunny Sharma, Limhamn (SE); Fredrik Dahlgren, Lund (SE); Alexander Hunt, Tygelsjö (SE); Gang Zou, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/690,155

(22) PCT Filed: Sep. 9, 2021

(86) PCT No.: PCT/EP2021/074808
§ 371 (c)(1),
(2) Date: Mar. 7, 2024

(87) PCT Pub. No.: WO2023/036421
PCT Pub. Date: Mar. 16, 2023

(65) Prior Publication Data
US 2025/0131839 A1   Apr. 24, 2025

(51) Int. Cl.
*G09B 5/00*   (2006.01)
(52) U.S. Cl.
CPC ..................................... *G09B 5/00* (2013.01)

(58) Field of Classification Search
CPC . G09B 19/00; A63B 24/0062; A63B 24/0065; A63B 2024/0068; A63B 2024/0071; A63B 2024/0081; A63F 9/02; A63F 9/0252; A63F 13/212; A63F 2300/1022
See application file for complete search history.

(56) References Cited

U.S. PATENT DOCUMENTS

2014/0171201 A1   6/2014   May et al.
2018/0001980 A1   1/2018   Hulbert
(Continued)

FOREIGN PATENT DOCUMENTS

WO   2017/089345 A1   6/2017

OTHER PUBLICATIONS

Qin et al. "AirFlow: Designing Immersive Breathing Training Games for COPD" CHI 2014, Apr. 26-May 1, 2014, Toronto, ON, Canada (Year: 2014).*
(Continued)

*Primary Examiner* — Robert J Utama
(74) *Attorney, Agent, or Firm* — Sage Patent Group

(57) ABSTRACT

A method executable at a user device for assisted execution of a primary activity is suggested, wherein the method comprise: acquiring biological data of a first user; adapting, based on the biological data, at least one biological behavior model, associated with a sequence of phases, constituting at least one primary phase and a preparatory phase preceding the primary phase, upon detecting a trigger to adapt at least one of the at least one biological behavior model; providing, based on the at least one adapted version of the at least one biological behavior model and the acquired biological data, updated guidance on execution of the sequence of phases.

20 Claims, 10 Drawing Sheets

(56) References Cited

U.S. PATENT DOCUMENTS

| | | | |
|---|---|---|---|
| 2020/0105389 A1* | 4/2020 | Garg | G06V 40/23 |
| 2021/0129032 A1* | 5/2021 | Elenbaas | A63F 13/212 |
| 2023/0329636 A1* | 10/2023 | Ramp | G16H 40/63 |

OTHER PUBLICATIONS

International Search Report and Written Opinion mailed Jun. 10, 2022 in corresponding International Application No. PCT/EP2021/074808 (13 pages).

Konttinen, et al., "Preparatory heart rate patterns in competitive rifle shooting" Journal of Sports Sciences. vol. 16, 1998—Issue 3. pp. 235-242. (9 pages).

Açikada, et al., "Effect of heart rate on shooting performance in elite archers" Heliyon, published by Elsevier Ltd, 2019 (11 pages).

Nam, et al., "Estimation of Respiratory Rates Using the Built-in Microphone of a Smartphone or Headset", Nov. 2016, IEEE Journal of Biomedical and Health Informatics 20 No. 6 (9 pages).

Apple Inc., "Monitor your heart rate with Apple Watch" Sep. 21, 2023, https://support.apple.com/en-us/HT204666 (4 pages).

Clemente, et al., "Study of the Heart Rate and Accuracy Performance of Archers" Journal of Physical Education and Sport® (JPES), 11(4), Art 66, pp. 434-437, 2011 (4 pages).

Despres, "Ready, Aim, Shoot! How Marksmen Use Heartrate To Shoot" https://indianapublicmedia.org/amomentofscience/ready-aim-shoot-marksmen-heartrate-shoot.php, Mar. 19, 2012 (2 pages).

Mohamed, et al., "Breathing Pattern Influence to the Shooting Performance" Abstract only. Proceedings of the International Colloquium on Sports Science, Exercise, Engineering and Technology 2014 (ICoSSEET 2014), Springer, Singapore (18 pages).

National Rifle Association, "Rifle Fundamentals: Breath and Hold Control" NRA Shooting Sports USA, Jan. 8, 2018 https://www.ssusa.org/articles/2018/1/8/rifle-fundamentals-breath-and-hold-control (3 pages).

\* cited by examiner

METHOD AND ARRANGEMENT FOR ASSISTED EXECUTION OF AN ACTIVITY

CROSS REFERENCE TO RELATED APPLICATION(S)

This application is a 35 U.S.C. § 371 National Stage of International Patent Application No. PCT/EP2021/074808, filed Sep. 9, 2021, designating the United States.

TECHNICAL FIELD

A method for assisted execution of an activity and an arrangement adapted to execute such a method.

BACKGROUND

Video games, often referred to as first Personal Shooter (FPS) video games, such as e.g. Call of Duty Warfare and Fortnite, are very popular for current console generations and these types of games will most likely be popular also in the future also for Virtual Reality (VR), Augmented Reality (AR) and Mixed Reality (XR) purpose. At the same time, realistic game physics and experiences for VR are providing for a way to improve the realism and the attractivity for VR simulations, paving the way not only for gaming but also for various types of real-life training. In the world of gaming or E-sport, as well as for real sport, the player/user/athlete improvement is a key domain which often includes information, statistics and feedback which can be used for improving the overall user experience further.

In real life, shooting training typically takes place in a shooting range or any other type of specially adapted location, but many FPS players do have limited or even no access to this type of facilities. Apart from the fact that accessibility to a suitable arena for training can be a limiting factor for a practicing individual, virtual training is usually both safer and cheaper, thereby providing an attractive alternative or complement to practicing in a real-world environment.

However, in order to be able to provide a "real" simulation feeling during virtual training more data associated with the respective task to be accomplished will be required. Furthermore, if additional data is acquired, such data should be exploited so that the mentioned task can be executed with even better precision than if no additional data was available, thereby obtaining a complementary type of activity for a user of the virtual training.

For realistic VR simulations, several biological parameters associated with the player might be used in the future, to propose adaptive games and a more "real" simulation feel. Such parameters may be acquired, e.g. by applying heart rate detection using a smartwatch, a movement detection by the VR setup, as well as breathing frequency detection through a VR microphone. This type of future usage might influence the games rules for additional realism and provide a "close to real life" simulation. This may also be applied to shooting games. Those biological parameters will have a direct effect on the shooting accuracy as heartbeat and breathing are two elements which may have a strong influence on the shooting accuracy.

With respect to heart rate patterns in association with shooting activities, "Preparatory hear beat patterns in competitive rifle shooting" by Konttinen et al. J Sports Sci. 1998, available at https://pubmed.ncbi.nlm.nih.gov/9596357/on 2021 Aug. 16 is examining the relationship between preparatory heart rate patterns and competitive shooting performance, whereas "Effect of heart rate on shooting performance in elite archers" by Açikada et al. Heliyon 2019, available at www.ncbi.nlm.nih.gov/pmc/articles/PMC6441821/on 2021 Aug. 16, examine the effect of heart rate on shooting performance in elite archers.

With respect to breathing patterns "Breathing Pattern Influence to Shooting Performance" by Mohamed et al. Proceedings of the International Colloquium on Sports Science, Exercise, Engineering and Technology 2014, abstract available at link.springer.com/chapter/10.1007/978-981-287-107-7_34 on 2021 Aug. 16 is a study which seeks to determine the relationship between breathing pattern and performance or score of shooting.

With the existing technology, the only elements considered in a shooting game are the player movements (depending on the platforms on which the game is played) and its reaction time when the trigger (or a game controller button) is pulled or pushed.

SUMMARY

An objective of embodiments disclosed herein is to solve or at least alleviate at least one of the above-mentioned problems.

According to one aspect, an objective is to provide a method at a user device for assisted execution of a primary activity is suggested, wherein the method comprises acquiring biological data of a first user, after which at least one biological behavior model, is adapted, based on the biological data, upon detecting a trigger to adapt at least one of the at least one biological behavior model at least one biological behavior model, associated with a sequence of phases, wherein the at least one biological behavior model constitute at least one primary phase and a preparatory phase preceding the primary phase. Updated guidance on execution of the sequence of phases is then provided, based on the at least one adapted version of the at least one biological behavior model and the acquired biological data.

According to another aspect, an objective to provide a user device for providing assisted execution of a primary activity is suggested, wherein the user device is configured to acquire biological data of a first user, after which it is configured to adapt at least one biological behavior model, based on the biological data, upon detecting a trigger to adapt at least one of the at least one biological behavior model at least one biological behavior model, associated with a sequence of phases, wherein the at least one biological behavior model constitute at least one primary phase and a preparatory phase preceding the primary phase. The user device is also adapted to provide updated guidance on execution of the sequence of phases, based on the at least one adapted version of the at least one biological behavior model and the acquired biological data, According to yet another aspect, an objective to provide a computer program is suggested, where the computer program comprise instructions, which when executed by processing circuitry of a user device, causes the user device to perform a method as described herein.

According to another aspect a computer program product is suggested, where the computer program product, comprise a computer program as described herein as well as computer readable means on which the computer program can be stored.

Further objectives, features and advantages of the presented embodiments will be apparent upon reading the following description, claims and the accompanying drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

DETAILED DESCRIPTION

Figure 1:
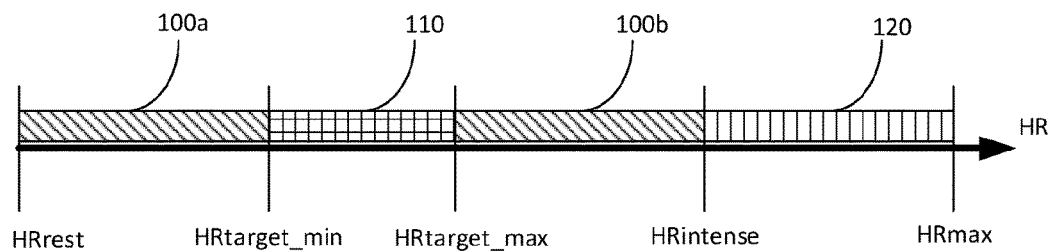
FIG. 1 illustrates an example of different heartrate zones.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description, unless specified otherwise.

Briefly, the present disclosure provides, according to various aspects and embodiments, improvements which may be applied on various types of platforms, which may also be referred to as user devices, adapted for shooting games, simulators, as well as other types of games, simulations, or real time activities which require one or more users to perform some type of high precision task, which may gain in precision from making use of available, relevant user specific biological parameters, such as e.g. heart beat and/or breathing. In addition to, or alternatively, the suggested user device may be a communication device, such as e.g. a smart phone, a laptop or any other type of computer, which has been adapted accordingly. The suggested improvements will add another layer of realism into games and simulations or beneficial assistance when executing a real time activity by taking into account a user's biological parameters and make the user aware of how those biological parameters influence the execution of a current task, such as e.g. a shot to be executed in a more realistic way, also enabling the user to execute the task more time efficiently and with better planning and/or strategy. Alternatively, the suggested improvements may be applied in association with real-world execution of a high precision task. Also in the latter scenario, biological parameters will be taken into consideration, for enhancing the final result.

More specifically, a method is suggested where data, comprising biological data, associated with a user, where the biological data has been captured in association with that the user has initiated a process for executing a high precision task, is evaluated and used for adapting what can be referred to as one or more biological behavior models or patterns, so that the one or more adapted biological behavior models or patterns can form a basis for assisting or guiding the user to execute the intended task with better precision, by providing updated guidance, compared to if no adapted biological behavior model should be available.

A biological behavior model or pattern, from hereinafter referred to as a biological behavior model, is in the present context to be construed as any type of model, modelling a typical behavior sequence of a user, or a group of users, executing a certain task, or possibly a task comparable to a certain task, where the model typically is based on historical biological data, statistical biological data or a combination of both, associated with the mentioned user or a specific group or category of users. By way of example a biological behavior model may e.g. model the biological behavior of a certain category of athletes, which category may constitute a certain age, age interval or gender, or certain specific physical attributes, such as e.g. a certain weight or height interval.

The historical and/or statistical data on which a biological behavior model is based may constitute one or more biological parameters which, to at least some extent, is decisive for how a human will react and behave when performing a specific physical and/or mental task. In order to be able to gain better precision when executing a task, due to the applying of a specific biological parameter and an associated biological behavior model, as suggested herein, such a model will comprise a sequence, which in the present context is to be referred to as a primary phase, such as e.g. the activating of a trigger of a shotgun in a shooting game. In addition, such a model also comprises one or more initial sequences, preceding the primary phase, each modeling what can be referred to as a respective preparatory phase, serving the purpose of assisting a user and picturing how the user about to execute the primary phase is to preferably prepare for the primary phase in an optimized way, i.e. representing a sequence of preparatory user behavior which is considered to improve the accuracy of the shooting, if executed in a specific manner.

A biological behavior model is adapted when it is considered that the applied model is not representative or suitable for the present behavior of a user. Based on the captured biological data the applied model is therefore adapted so that it represents the user's behavior in a more representative way when a specific trigger indicating that an adaptation is required. Such a trigger may e.g. be based on that the discrepancy between an acquired parameter and a corresponding part of a sequence of a biological behavior model is exceeding a certain threshold value, e.g. due to that a user fails to act according to a certain model, representing a statistical or ideal user. Such a trigger may e.g. indicate that the user will need to try to follow e.g. a longer preparatory sequence, or even an additional preparatory sequence for preparing for the primary task in a more optimal way, thereby being able to successfully execute the relevant, primary task within a minimum amount of time.

The mentioned adaptation procedure may be required during execution of a specific task if e.g. a user is considered to be able to complete a primary task successfully relatively soon after the adaptation. Alternatively, the mentioned adaptation and updating process may need to be repeated one or more times e.g. due to disturbing environmental conditions, which may delay the time required for completing the primary task, or due to that the user fails to complete the primary task one or more times due to e.g. lack of concentration, thereby having to retry to compete the task repeatedly. In the latter situation, alternative models or sequences may be used for the purpose of training and learning a preferred behavior under certain specific circumstances.

By recording how a user is capable of following certain sequences of models for further studies, a user will also be able to learn how to react to certain events or in certain scenarios also when the suggested method is no longer used.

A model typically provides assistance or guidance to the mentioned user, here referred to as a first user and possibly also one other user, here referred to as a second user, where the second user may be a user assisting the first user in executing the mentioned task, e.g. in situations where the primary task is a task that preferably is executed as a team effort. When a second user is executing a task in cooperation, the precision of the outcome of such a task my, to a large extent, rely on a second user or a plurality of users, having knowledge on how well a first user is able to behave and act by following a certain model, as described herein. It is to be understood that even more than two users may apply the suggested method when executing a task in cooperation.

Based on updated versions of the one or more biological behavior models applied by the method, where each model may have been adapted one or more times, or may have been applied un-adapted, and the acquired biological data, guidance on how the user should react and proceed towards successful completion of the relevant primary task is provided to the user via one or more suitable presentation or rendering means. More specifically, the suggested updating comprises analyzing and interpreting how well the user sequentially is following the applied one or more biological behavior model and deriving an indication on the present state of the user, with respect to the one or more parameters under investigation with the aid or assistance of the applied one or more biological behavior model. Possibly analyzation and interpretation may consider one or more future estimated measures, in addition to one or more real-time measures.

The guiding of a user provides for a live and dynamic feedback, offering a perfect feature for e.g. training, simulation or cooperation purposes. The guiding provides a user with input on how to control the body, or more specifically, certain body parts, based on biological data of the user to influence on the accuracy and timing of execution of the relevant one or more preparatory task and the primary task.

Thereby a user will be able to use the suggested method e.g. for training or simulation purposes in a virtual world with the same complexity than in the real world. In addition, a user may use the suggested method e.g. for training in a real-world scenario.

Many different aspects can be covered by the proposed solution and many use-cases can be identified, as long as there is a need to strive for better precision during execution of a primary task. In addition to what has been mentioned above, with respect to gaming, the suggested method may also be applicable in various simulation scenarios, such as e.g. simulation of authentic critical scenarios, relevant for military, police, fire fighters or athletes. The latter scenario may e.g. include archery or biathlon. Even though the suggested method is not suitable to be used during sports competitions, it can be a method well suitable for practicing and learning optimal personal behavior, strategies and timing, especially in specific challenging environments or under certain conditions. In addition to providing realistic virtual situations for training or simulation purposes, the suggested method may also be used in real-life situations e.g. by the mentioned categories, or whenever execution of a high precision task may rely on one or more biological parameters, which are available during the execution.

As will be shown in further details below, the method may e.g. be applicable in a scuba diving scenario where a smooth, stable and safe breathing pattern is important for an optimal experience, or in a photography mission. In the former scuba diving example, it is normally important that the person applying the suggested method on equipment worn by that person, as well as any accompanying person, both can render the guiding data or information in real time, in order to experience a safe dive, whereas other situations may refer to a more individual guidance, addressing only one single user and user device.

Considering biological behavior of athletes, it is e.g. generally known that inexperienced archers generally have higher heartrate (HR) than experienced archers during practice and competition. It is also known from research that pistol shooting competitors generally shoot with higher precision when their heart rhythm increases from approximately eight to twelve beats over their resting heart rate per minute.

FIG. 1 is an illustration of how the HR of a specific category of athletes may impact the accuracy of a shooting in a game, a simulation or in real life. With a low heartrate, lying within interval 100*a*, between HRrest to the left of the figure, and HRtarget_min, an athlete of the relevant category is considered to be training at a moderate accuracy. With a higher heart rate, instead lying in an accuracy interval 110 between HRtarget_min and HRtarget_max, the same athlete is active in what can be considered as the best or optimal accuracy interval 110, whereas if this interval is passed with a further increased heartrate, thereby ending up in the interval 100*b*, between HRtarget_max and HRintense, the athlete is active within another moderate accuracy interval 100*b*, between HRtarget_max and HRintense. Finally, the heartrate may reach an even higher interval 120, between HRintense and HRmax, which in this example is referred to as an inaccurate interval 120, where the accuracy of a high precision task is expected to be at its worst and thereby should be avoided, if possible.

Dynamic and personalized intervals for a shooter or a category of shooters according to FIG. 1 could therefore, according to one example, be based on statistical data, stating the whole interval between HRrest and HRmax, where, according to one example, HRtarget_min could be set to e.g. HRrest+8, whereas HRtarget_max could be set to e.g. HRrest+20 and HRintense could be set to e.g. 0.8× HRmax. If the biological data to be applied by the method suggested herein is the heartrate, a biological behavior model may, at least partly, be based on the data available in FIG. 1, where a user is guided to gain a heartrate in the optimal heart rate interval 110 when about to complete a primary task, before at least one preparatory phase, considered suitable for assisting the user to reach the optimal heart rate interval 110 has been finalized.

Breath is another biological parameter which has an important role in shooting accuracy. Control of the breathing process can therefore help a shooter to increase the shooting performance just as the shooting performance may decrease if the shooter cannot control the same sufficiently well. The breathing control technique is based on natural respiratory patterns which may be depicted according to FIG. 2, where the upper graph illustrates a typical natural respiratory pattern, whereas the lower graph illustrates an example of a breath control scenario based on a typical natural respiratory pattern.

Figure 2:
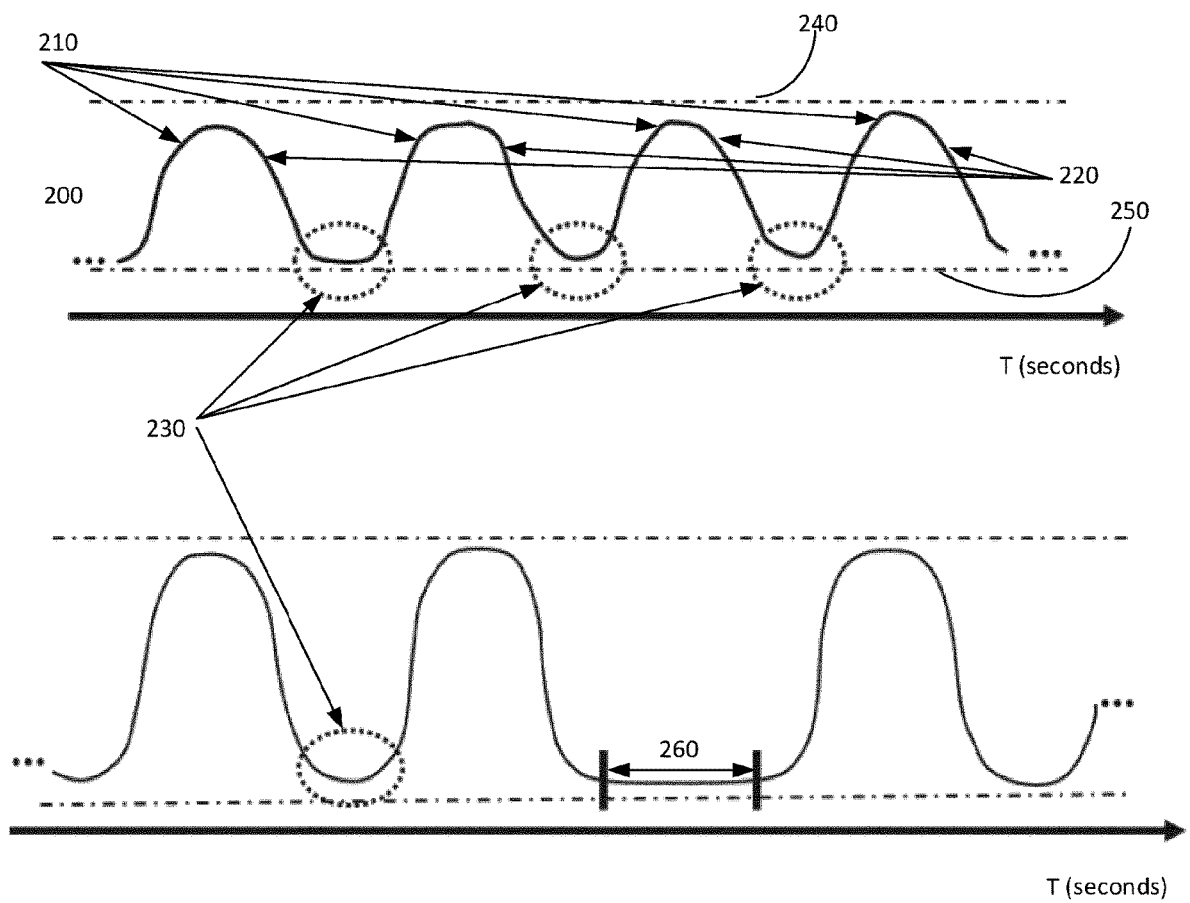
FIG. 2 illustrates an example of a natural respiratory pattern or model and an associated breath control pattern or model

The natural respiratory pattern 200 of FIG. 2 comprises an inhalation 210 followed by a respective exhalation 220, sequentially repeated and distributed over time, where the breath frequency and the natural respiratory pauses (NPA) 230 are relevant for the appearance of the pattern. A typical full lung inhalation level is illustrated by upper level 240, whereas a typical empty lung exhalation level is illustrated by lower level 250, appearing when the lungs are emptied. An NPA 230, which is dynamic and user dependent can be acquired, averaged and assembled as a respiratory model by capturing and processing data, representative of the breath during normal breathing times, e.g. when a user or category of users are executing an activity, requiring a normal breathing pattern. Shooting during an exhale period 220 would normally lead to lower accuracy, whereas shooting during NPA 230 is preferred. However, for optimized accuracy, the NPA 230 need to be somewhat prolonged so that the shooter is holding the breath and shoots somewhere within the prolonged NPA interval 260, which is individual, but can be expressed e.g. as an interval between NPA+1s and NPA+3s.

Figure 3:
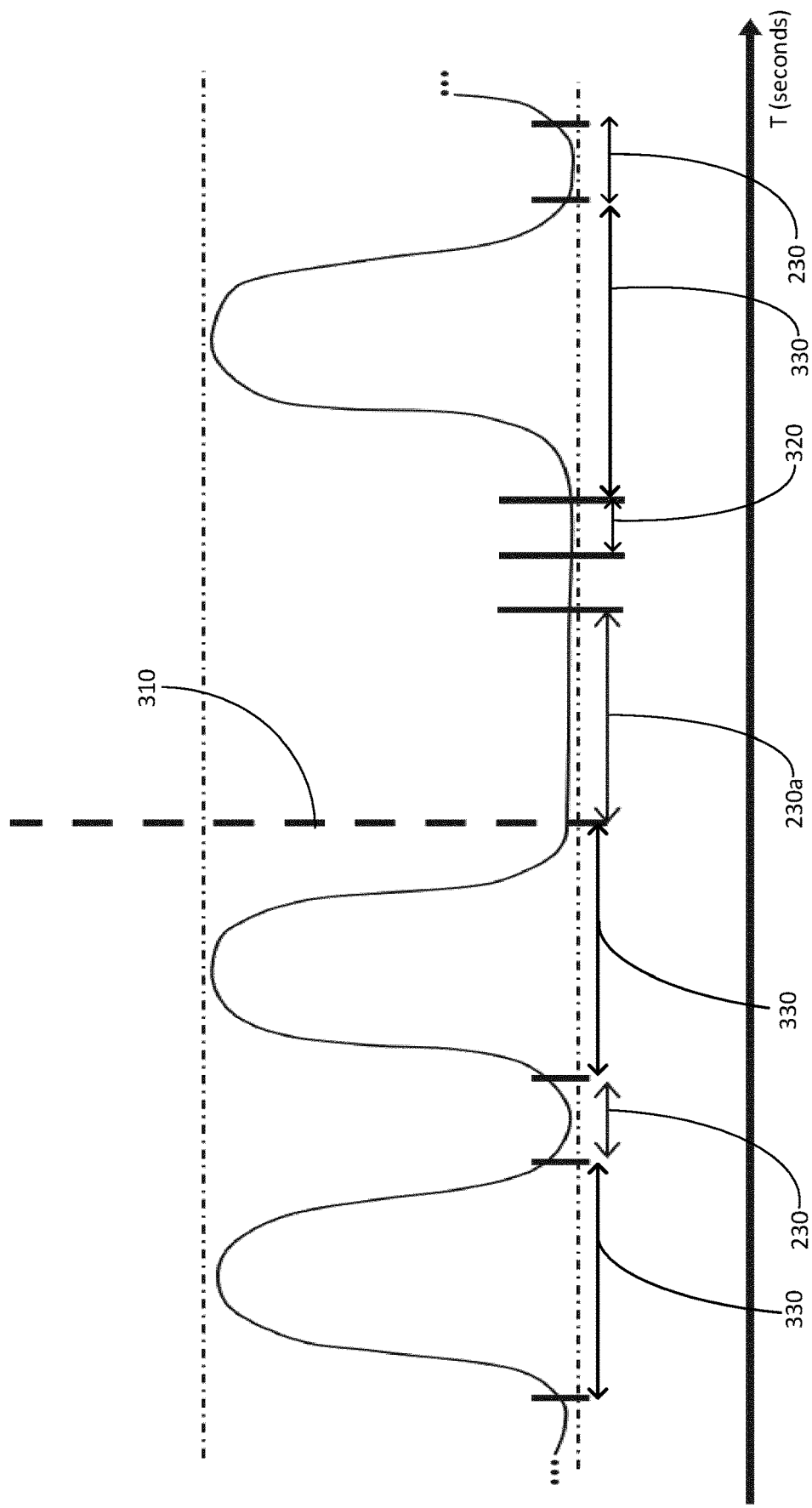
FIG. 3 illustrates the breath control pattern or model of FIG. 2 when expressed in further detail.

The process mentioned above is illustrated in more detail in FIG. 3. A normal breathing phase, preceding the actual shooting phase comprise what could be referred to as a normal NPA 230. During a shooting phase a shooter should start to squeeze the trigger, preparing for the shooting within a time interval, starting at 310, hold his breath during a first part of a prolonged NPA interval 230a, being on hold, before pressing the trigger and shooting somewhere within a second part of the prolonged NPA interval 320, which corresponds to the optimal interval 110 of FIG. 1. In FIG. 3 intervals 230 and 230a would correspond to the moderate zones 100a, 100b of FIG. 1, whereas intervals 330 correspond to the inaccurate interval 120 of FIG. 1.

By being guided to follow the breath pattern according to a model as expressed in FIG. 3, a shooter may be assisted or guided for optimized shooting accuracy. Typically, the suggested method applied based on a breath-based model may be used during practice so that the user is gradually learning how to follow the applied breath pattern and so that he eventually can shoot in a natural way, without requiring the guidance.

Movements of a shooter may be detected e.g. by applying an accelerometer on the shooting gear and possibly also on a VR headset, in case of a user playing a game or simulation. In a shooting scenario there are typically two types of movement that can be taken into account, namely the hand movements and the head movements.

Figure 4:
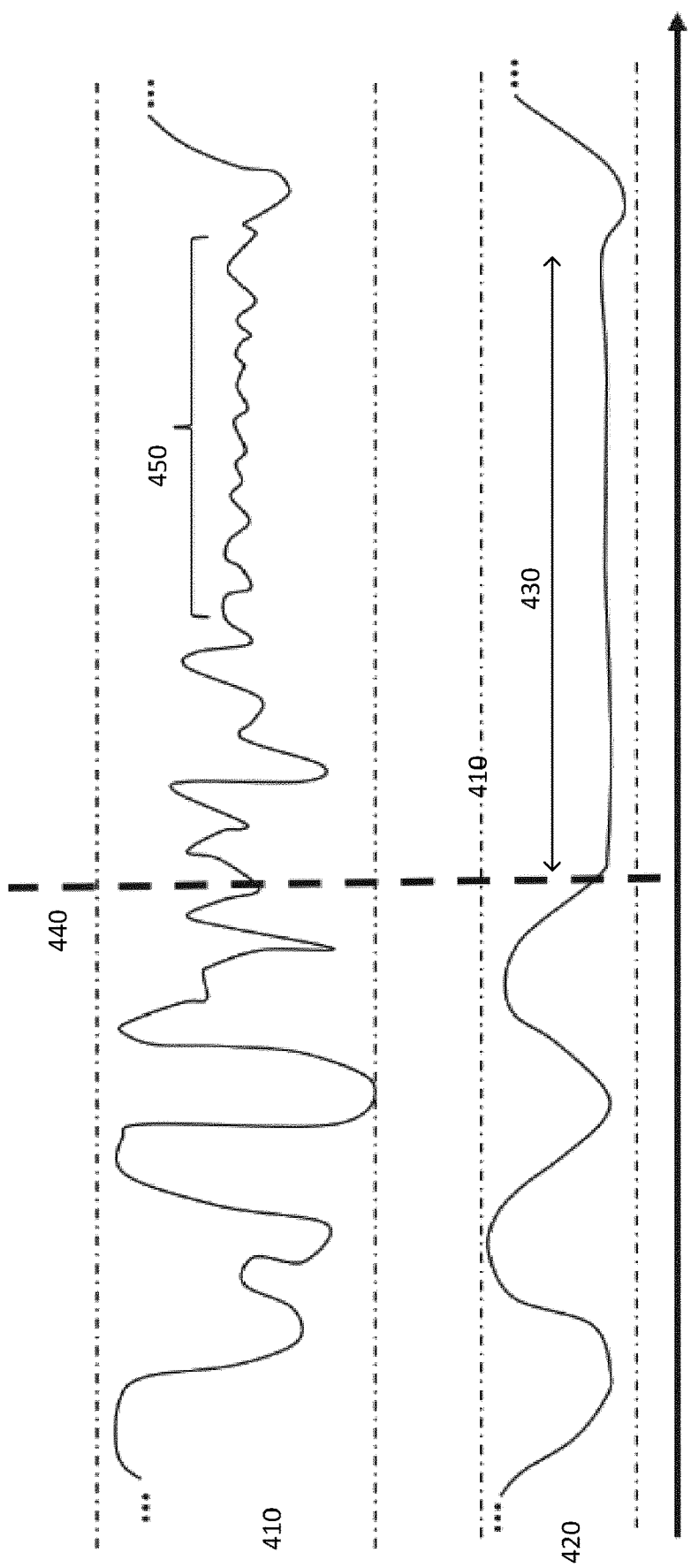
FIG. 4 illustrates an aiming and hold control pattern or model as well as an associated breath control pattern or model.

Both hand and head should be kept as still as possible just preceding and during the actual shooting. Ideally the registered movements should be synchronized with the breath control, as shown in FIG. 4, where the upper model 410 is representing movements, associated with aiming and hold control during a shooting activity, and the lower model 420 is representing breath control. Both the frequency and amplitude of the movement are parameters relevant for optimization of execution of a high precision task. Typically, movement is only monitored in detail during the breath control phase 430, where aiming at the target may e.g. begin at the beginning of the breath control phase 440 and with the optimal period of holding the trigger within interval 450. For this reason, it may be advantageous to synchronize movement control zones with breath control zones in order to optimize the accuracy.

Figure 5:
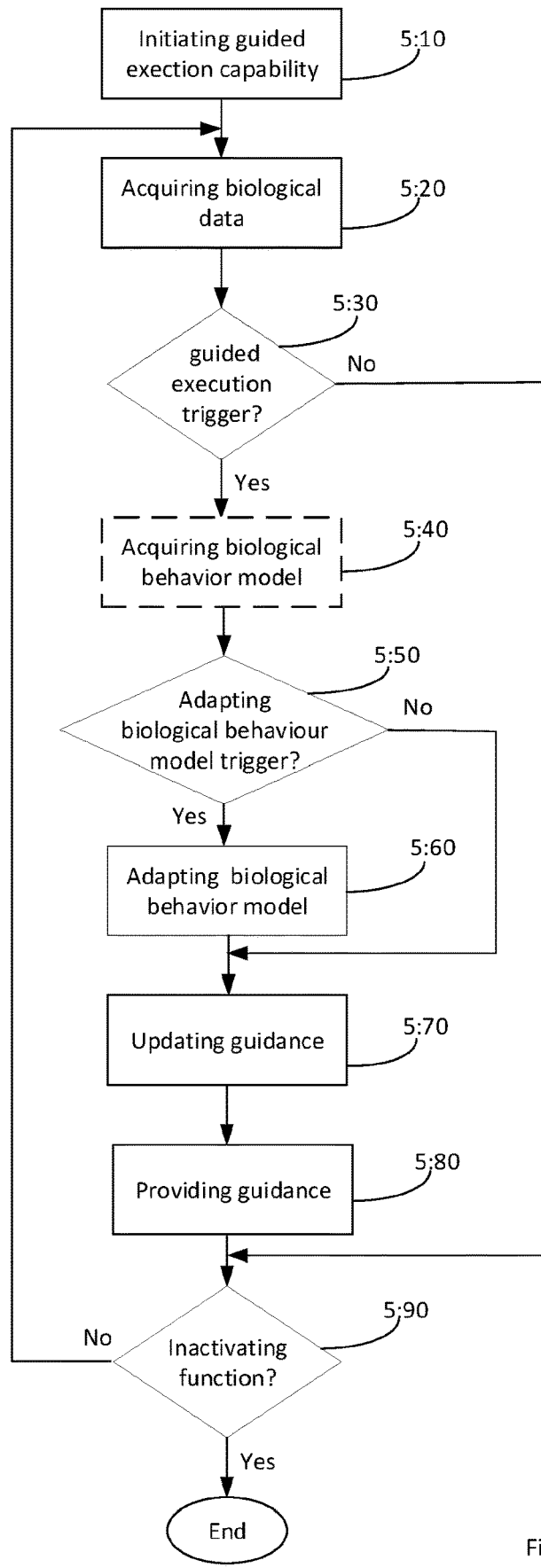
FIG. 5 illustrates a flow chart of a method for assisting execution of a task.

FIG. 5 is illustrating a method for providing guidance to a user, as suggested herein, where in a first step 5:10, the user is activating or initiating guided execution capability, i.e. preparation for guidance, as described herein, is initiated. Alternatively, the mentioned feature is initiated automatically, e.g. once a specific activity, such as e.g. a shooting game, is initiated or activated by a user. According to yet another embodiment, this function may be triggered by a specific trigger, such as a specific parameter, such as e.g. when a monitored user breath is exceeding a certain threshold value.

In another step 5:20 biological data, needed for enabling guidance as suggested herein, is acquired. Typically, the mentioned data will be continuously acquired from the time event that the guidance was started, until the mentioned feature is terminated, but alternatively, such data may be acquired on a continuous basis. Biological data may therefore, for various reasons, have been acquired also earlier, but step 5:20 may alternatively e.g. trigger certain combinations of biological data to be acquired and/or certain combinations of biological data or a single type of biological data may be acquired at a changed rate, due to the trigger of 5:20, normally being a consequence of execution of step 5:10. Different biological data may also be acquired at different occasions and sequences of accomplishing a specific task, such that e.g. in case a user fails to accomplish a preparatory sequence successfully, this sequence may be adapted, whereby additional parameters may be considered in order to improve the chances of successful accomplishing a primary task in a repeated attempt. The biological data may be divided into long-term biological data, i.e. biological data that is changing at a moderate pace, and, which therefore can be captured at a more moderate frequency, such as e.g. at the order of minutes, whereas biological data which may change more rapidly, is typically captured at a shorter frequency, such as e.g. by capturing samples per second. Heartrate is one example of typical long-term biological data, whereas breathing patterns and hand movements are typical examples of short-term biological data. It is also to be understood that the capturing frequency may be dynamic, such that e.g. the frequency for capturing certain biological data can be increased or decreased based on the applicable phase, or due to triggering of a certain event, which calls for a change, such as e.g. a certain parameter exceeding a certain threshold value.

As is indicated with step 5:30 actual guidance will typically only be provided to a user when a demand for this is triggered. Such a trigger may e.g. be that a certain biological parameter, acquired in step 5:20, such as e.g. an indication of the breath of a user, is exceeding a certain threshold value, either in absolute value or to a certain degree, thereby indicating a need for guidance of a user. Other types of biological data may include e.g. pulse, blood pressure, body temperature, iris analysis, sleep analysis and speech analysis. In case also step 5:10 is initiated based on a threshold value, this threshold value may typically be lower than the threshold value applied at step 5:30. As long as no trigger is identified in step 5:30 new biological data is acquired and compared to the one or more applicable trigger values and a user is preparing for execution of the primary task in a conventional manner, i.e. without applying any guidance, but by, at any event being prepared for initiation of such guidance.

However, once guided execution has been triggered, one or more biological behavior models are acquired, as indicated with step 5:40. Typically, a user has either selected one or more specific models to be applied out of available ones, or one or more specific models may have been selected more or less automatically, where the user may have e.g. entered certain personal data, which can then have been used as a basis for the process to automatically selecting one or more suitable models. Based on detected changes of acquired biological data, one or more previously selected models may also be replaced by one or more other models, considered more suitable for the present circumstances at this stage of the process.

Alternatively, one or more specific models may already have been selected e.g. at any of steps 5:10 or 5:20, if it is determined that suitable model selection can be executed already at any of these stages.

One or more models can be applied by the process, as long as acquired biological parameters permits such models to be used. A specific model may e.g. be continuously used as long as a certain acquired biological parameter value is kept within a certain allowed diverting interval. In the latter scenario the model does not have to be adapted, meaning that the No branch of step 5:50 bypasses the adapting biological behavior model step 5:60, whereas if adaptation of the model is triggered in step 5:50, the applied model is instead adapted, accordingly in step 5:60. The trigger may, according to one embodiment, be based on the determining of an anomaly in the acquired biological data, i.e. at least parts of the acquired biological data is found to fall out of an acceptable interval, thereby prohibiting the user to follow the model without any adaptations of the model being executed. More specifically, the anomaly may be based on a divergence of at least part of the biological data, diverging from expected biological data with more than a threshold value or by falling out of an acceptable interval. An adaptation may include the addition of a preparatory phase, or adaptation of an already existing preparatory phase, where the addition provides for an activity for guiding a user to reduce the biological data divergence.

Adaptation of at least one biological behavior model may, according to one embodiment, comprise correlating the acquired biological data with at least one of the at least one biological behavior model, whereas the adapting is executed based on the discrepancy between the correlated data.

The mentioned adapting, comprising one single adaptation or a plurality of, more or less, mutually dependent adaptations, may be executed in different ways, where one or more adaptations may be applicable. As already mentioned above, a preparatory phase may, according to one embodiment, be added to the sequence of phases. Alternatively, or in addition, a preparatory phase of the sequence of phases may be removed, in case it is not considered to be applicable or suitable under the present circumstances. According to yet another embodiment, the duration of at least one preparatory phase may be adapted, such that the duration is increased, e.g. in case a longer preparatory phase is considered needed for a user to complete a primary activity. Alternatively, the duration may instead be decreased, in case the present duration is not considered needed for successful execution of the primary task. According to yet another embodiment, the structure of at least one preparatory phase may be adapted, e.g. by changing the structure of a statistical model to become more user specific. According to another embodiment, a biological behavior model may be adapted based on environmental data captured in the environment of a user, such that e.g. the model is adapted based on the temperature or the wind in the environment, where a user is attempting to complete a primary task in an optimal manner. According to yet another embodiment, weights associated with captured biological data to be applied on the at least one biological behavior model may be adapted, such that e.g. some environmental factors are weighted higher than others, depending on their mutual effect on each other. According to another embodiment, the number of sensors to apply for capturing biological data required for the at least one biological behavior mode may be adapted, such that e.g. more wind sensors are applied, in case a wind dependent parameter has been weighted to be of higher importance. According to yet another embodiment, the types of sensors to apply for capturing biological data required for the at least one biological behavior model may be adapted, such that e.g. one type of sensors may be added if a certain biological data category is going from having been irrelevant to relevant, or if a type of sensors is removed or inactivated, e.g. in case a certain category of biological data is no longer considered to be measurable. The applied weights may also be dynamically adapted to a suitable neural network algorithm or machine learning algorithm which is capable of considering available biological parameters as well as additional data, such as e.g. environmental data, which may have potential impact on how well a user can execute a primary task.

The adapting of the at least one biological behavior model may alternatively comprise replacing one biological behavior model with at least one other biological behavior model, e.g. due to that the focus of the first biological behavior model is switching to the other one, or adapting may comprise complementing one biological behavior model with at least one other biological behavior model, in case both models continues to be of relevant importance.

In a next step 5:70 the guidance of the user is updated at the relevant user device, meaning that the user is made aware of how well the structure of the applied one or more biological behavior models is or are followed by the user and/or what the user needs to do next, in order to be able to follow the applied one or more biological behavior models in an optimal way. Such an update may e.g. mean that due to the present sequence and state of the model, guidance may switch from rendering an optimized or predicted state from a sequence of potential states to rendering a critical state, e.g. by switching from a visual presentation rendered in yellow or green color, representing a state which is shortly preceding the primary task to be executed, to a visual presentation, rendered in red color, representing a state more distant to the completion of the primary task.

Alternatively, or in combination to visual presentation, the mentioned presentation may be audible, haptic, or executed, using any type of available sensorial presentation means, depending e.g. on the required perceptibility of the guidance. Means of presentation may also depend on whether the presentation is addressing only one user or additional users. The updated guidance is provided or presented to the user in step 5:80, where visual guidance is typically presented on a display or screen which is visual to the user. Audible guidance may be provided via e.g. earphones, whereas haptic guidance may be provided via e.g. any type of wearables, such as e.g. an electronic wristband or haptics integrated in a body suit, adapted to provide suitable haptic effect to a wearer. Audible and/or haptic guidance may be preferred over, or used as a complement to, visual guidance e.g. in situations where the risk of bad visibility is high, such as e.g. during scuba diving, or during a rescue mission in case of a fire.

The described process, where updated biological data is acquired and evaluated against possible triggers, is typically repeated until inactivation of the mentioned guidance function, as indicated with step 5:90.

Figure 6:
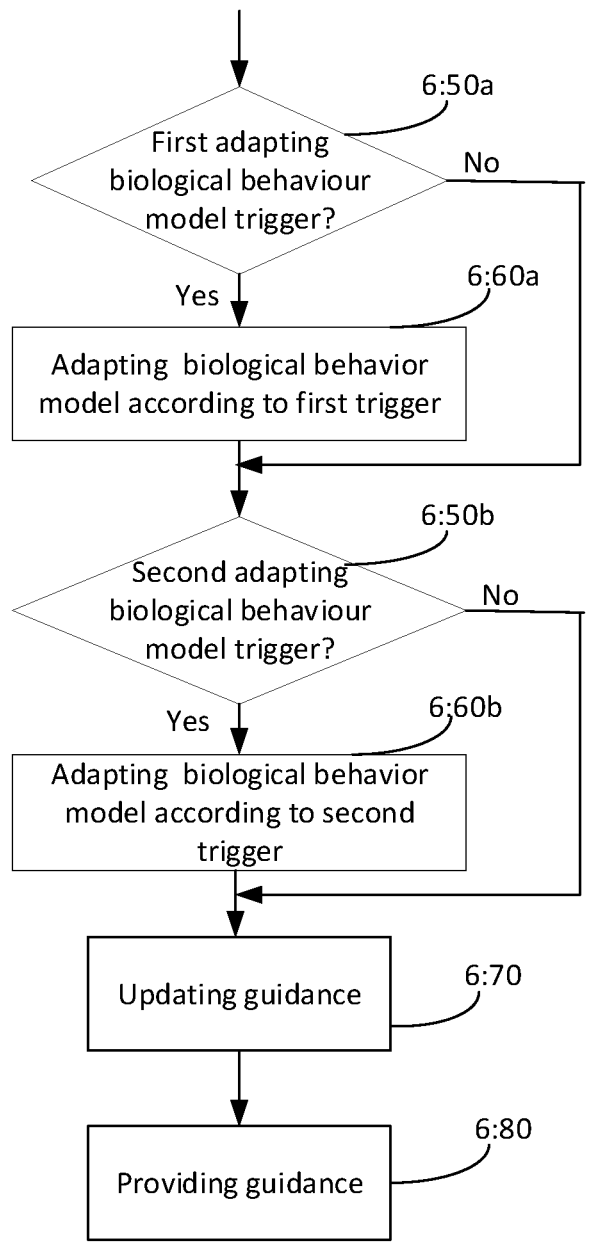
FIG. 6 is a flowchart showing the triggering and adapting sequences of FIG. 5 in a scenario where these sequences ca be repeated with respect to different parameters.

FIG. 6 is an illustration of how steps 5:50 and 5:60 of FIG. 5 may be repeated in case more than one parameter is applied for triggering adaptations. According to FIG. 6 a first adapting biological behavior trigger can be launched in step 6:50a, where, in case of a first trigger, a relevant biological behavior model is adapted accordingly in a following step 6:60a, whereas a second trigger, may give rise to another updating procedure in steps 6:50b and 6:60b, respectively. Alternatively, the two trigger and adapting processes may be executed more or less in parallel. Guidance is updated, according to step 6:70, and provided for rendering, according to step 6:80, once all relevant models have been updated accordingly. It is to be understood that alternatively, an arbitrary number of models may be updated one after the other or in parallel, where such updating procedures may depend on each other, or be executed more or less independently.

Figure 7A:
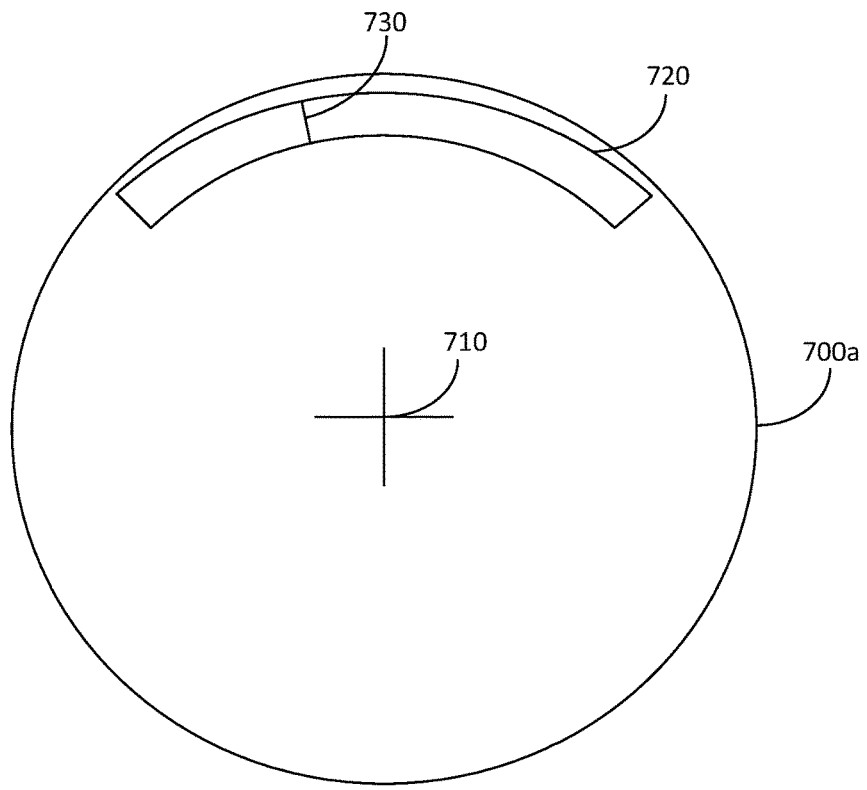
FIG. 7a is a simplified illustration of a binocular sight for presentation of assisted information according to one embodiment.

A sequence of exemplifying visual presentations will now be described, with reference to FIG. 7a-7d, where FIG. 7a is a simplified illustration of how a visual presentation of updated assisting information can be provided, according to one possible embodiment. FIG. 7a is a simplified illustration, showing a binocular sight 700a, as seen by a user, e.g. when engaged in a shooting game, where the binocular sight 700a is comprising a crosshair 710 in its center. The binocular sight 700a comprises a bar 720, here illustrated as a dynamic shooting accuracy bar, located on its upper part, where the bar of FIG. 7a is set at level 730. Typically, an applied graded scale can be represented as different colors, where green color e.g. may indicate that the user is in progress of executing the primary task according to plan, i.e. well in line with an applied model, whereas yellow color may represent a moderate divergency from the model, while red color may represent high divergence or a critical situation in relation to the model behavior.

Figure 7B:
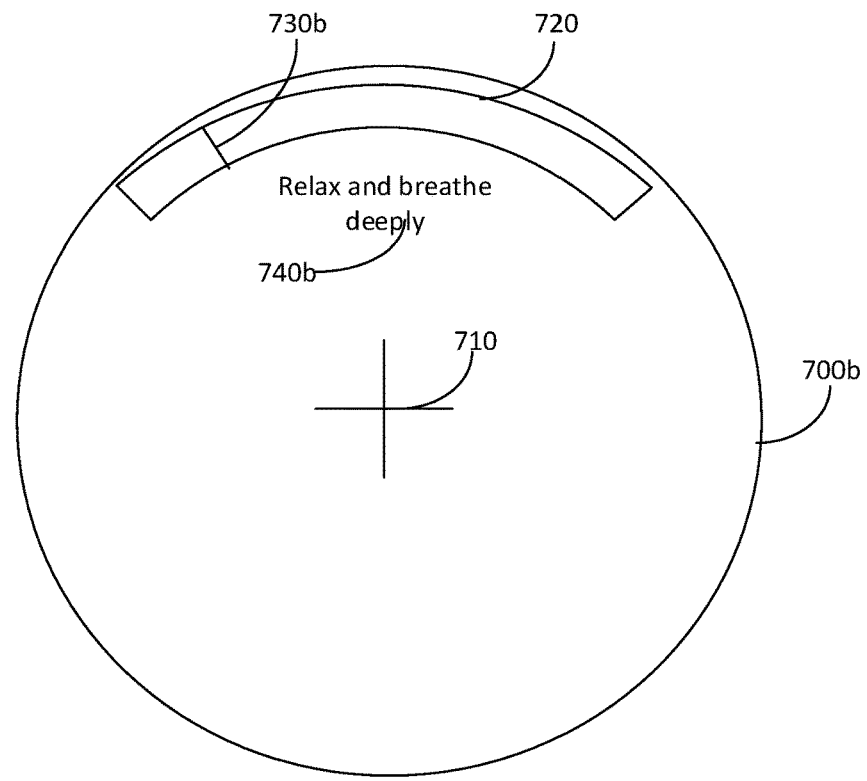
FIG. 7b is a simplified illustration of a binocular sight for a first presentation of assisted information according to another embodiment.

FIG. 7b is another simplified illustration of a binocular sight 700b, which corresponds to what is shown in FIG. 7a, with the addition that the binocular sight 700b of FIG. 7b also comprise textual information 740b, applied to further assist the user. In the present example the text 740b is disclosing an instruction for a user on what to do next, here exemplified with "Relax and breathe deeply", presented when the level 730b of the bar is indicating a relatively limited amount of the bar 720. It is to be understood that one or both of the bar 720 and the accompanying or complementary information 740b may alternatively be provided elsewhere on the binocular 700b. Alternatively or in addition, specific sensor information, which is available, in addition to the model dependent information, may also be provided as additional information to the user. Such information may also be provided as text information, or in another suitable format. As an alternative to text information, user assistance may be provided as a symbol, such that e.g. information informative of the present wind may be presented as a dynamic symbol of a flag, indicating a representation of the present strength of the wind.

Figure 7C:
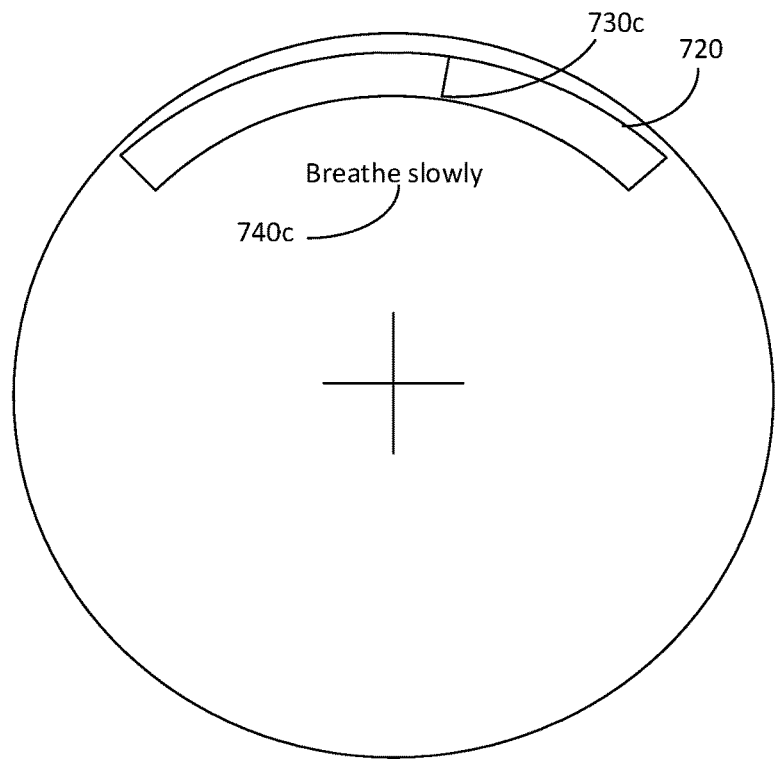
FIG. 7c is a simplified illustration of a binocular sight for a second presentation of assisted information according to the embodiment of FIG. 7b.

FIG. 7c is illustrating yet another sequence where the level 730c has now moved closer to an optimal level, where the user is now presented with another instruction 740c, here, exemplified with "Breathe slowly".

Figure 7D:
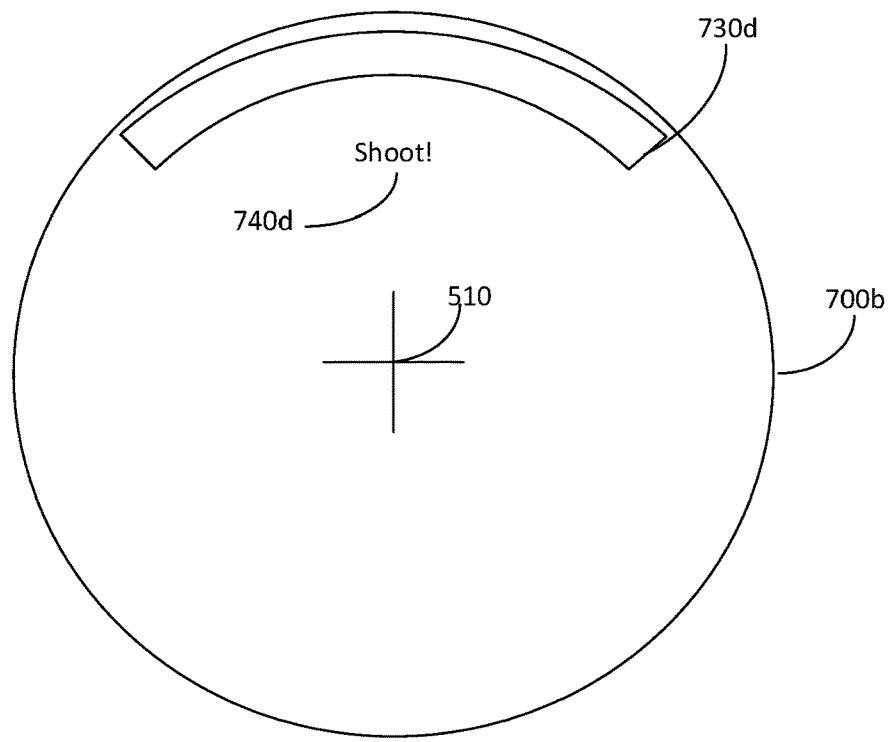
FIG. 7d is a simplified illustration of a binocular sight for a third presentation of assisted information according to the embodiment of FIG. 7b.

FIG. 7d is illustrating a scenario, which could typically be a final scenario of a sequence, such as the one illustrated in FIG. 7a-7d, where the level 730d is now showing the full scale of the bar 720, together with an instruction 740d, exemplified with "Shoot!", i.e. an instruction to execute a primary task.

Preferably, the information is provided at a location where it provides a minimum of disturbance to the sight of the user, whereas the information to be presented at the same time is easy to recognize and interpret by the user. Alternatively, the text 740d may be replaced or accompanied by providing e.g. audible instructions, haptic sensing information or any sensorial way to present information, depending on which form of presentation that is considered most suitable under the present circumstances or for the present task. By way of example, one or more sensors, capturing that a user is shaking his hand may provide such information so that it may be presented as a hand, presented in red color, accompanied with text, urging the user to "keep hand steady", whereas the symbol turns to yellow and green as the hand gradually goes steadier and steadier, based on the interpreted sensor input. However, in order to be as user friendly as possible, a typical means of presentation will comprise as few different sources of information as possible, whereas the applied source or sources of information is/are kept as informative as possible.

By way of example, the dynamic shooting accuracy bar 720 may show the present expected accuracy of a shot, based on the one or more applied models and how well the user is following the present sequence of the model. More specifically, a bar 720 with a level 730, which is showing only between 0 to 50% of its full bar, and which is presented in red color may assist a user being in a preparatory phase, unsuitable for shooting, whereas an accompanying text or symbol may show an instruction to the user to prepare for execution of the primary task, whereas a bar filled between 50 to 75% of a full bar, which is presented in yellow color may instead assist a user being instructed to aim and press a trigger of a virtual or real shooting gun, since the user is now close to the optimal shooting event, whereas a bar showing between 75% and 100% of the bar and additional information, expressing that firing of the shooting gun is advised, may assist the user when shooting is preferred.

As already mentioned above, a bar used for indicating an expected shooting accuracy in real time may be based on a plurality of parameters, which may comprise biological parameters and possibly also additional parameters, such as e.g. environmental parameters, which are continuously correlated to one or more applied models. As also mentioned above, such parameters may be weighted, so that e.g. different parts of different applied models are more or less important at different sequencies in time during the process to prepare for an optimal execution of a primary task. According to one example, shooting accuracy may be based on the following data D:

$$D = W1*Bf + W2*Hb + W3*Hem + W4*Ham$$

Where W1-W4 are different weighting factors, which may be static or dynamic, and where Bf is representing breath frequency data, Hb is representing heartbeat data, Hem is representing head movement data, whereas Ham is representing hand movement data.

According to one example, the data exemplified above may be correlated against one or both of a breath frequency model and a heartbeat model, where the Hem and Ham data may be used as data, indicating how to adapt the models, e.g. how to prolong a preparatory phase of one or more respective models, if that is found needed.

The method as suggested above is mainly suitable and adapted for assisting a single user on a first user device, so that this single user is able to follow the progress towards execution of a primary task, and can be guided through the execution process, based on acquired biological data, associated with that user. As it has already been mentioned, however, the suggested method may also be adapted to assist an accompanying second person in completing a primary task by indicating to a second user, on a second user device, how the first user is accomplishing the primary task, based on biological data of the first user, where also the second user can be guided through the process of executing a task in cooperation with the first person. In the latter scenario, the second user need to have full attention of the assistance, preferably in addition to the first user.

The scenario mentioned above, which can be referred to as a pair-scenario or buddy-scenario, will now be described in a scuba-diving scenario, involving a pair of scuba-divers or dive-buddies, but may also be applicable in other scenario, such as e.g. for two firefighters in mission.

In many scuba-diving situations, one or both users, typically referred to as dive-buddies, are using a respective dive computer, which helps the respective scuba-diver to keep track of an ongoing dive, by informing the scuba-diver about important information to keep track of, such as e.g. the maximum allowed diving time at a certain depth, as well as one or more time intervals, where a scuba-diver is instructed to remain at a certain depth during ascending to the surface at the end of the dive, in order to provide for a safe dive. Additionally, dynamic parameters, such as e.g. amount of remaining oxygen in the tank of the scuba-diver, remaining dive time and water temperature at a current depth, are monitored and presented to the scuba-diver, who can plan for a safe dive and take appropriate decisions, based on such additional, dynamically updated information.

For safety reasons, scuba-diving is recommended to always be executed in pairs, i.e. together with a dive-buddy. However, in order to complete a safe dive, it is of utmost importance that the two dive-buddies can communicate relevant information between each other. Normally, such communication is limited to pre-determined hand gestures, which can be used for signaling, monitored parameters of your own equipment to the dive-buddy. The energy spent by a scuba-diver may differ considerably between dive-buddies, since it may depend on a number of different circumstances, such as e.g. how each diver is personally effected by water temperature, currents, as well as the physical shape of the diver and the personal diving technique. Naturally the amount of oxygen that a scuba-diver consumes depends on the energy spent by that diver. Consequently, risks associated with scuba-diving are reduced if both dive-buddies can minimize their energy consumption while diving, and, consequently, it is also desirable that each diver is able to continuously monitor not only relevant biological data about one-self, but also relevant biological data associated with the dive-buddy. By being able to observe how well one or more models are followed both by one-self and the dive-buddy during guidance, it will be possible to get a better picture of the state of also the dive-buddy, as well as an early warning, in case a serious discrepancy from one or more model is about to occur for not only one-self, but also for the dive-buddy, thereby allowing the respective user to return to a more desired state, based also on assistance from the dive-buddy, thereby also allowing the dive-buddy to act calm and supporting towards the dive-buddy during the mentioned process.

The suggested method may reduce the risk of blackout or other incidents in a way which is not possible if only conventional, personal diving computer information is available, since such equipment fails to also consider biological data in combination with a biological behavior model, and since it also fails to consider biological data of both cooperating persons. In the buddy-scenario, suggested herein, breathing and heart rate may be monitored and applied to respective biological behavior models, just as mentioned for the single-user case. Additionally, or alternatively, monitoring of movement of a diver, e.g. by monitoring strokes by the legs of the divers, e.g. with the help of an accelerometer, or reaction of the divers eyes, e.g. by monitoring the eye gaze, may be applied as an alternative or complement.

Figure 8:
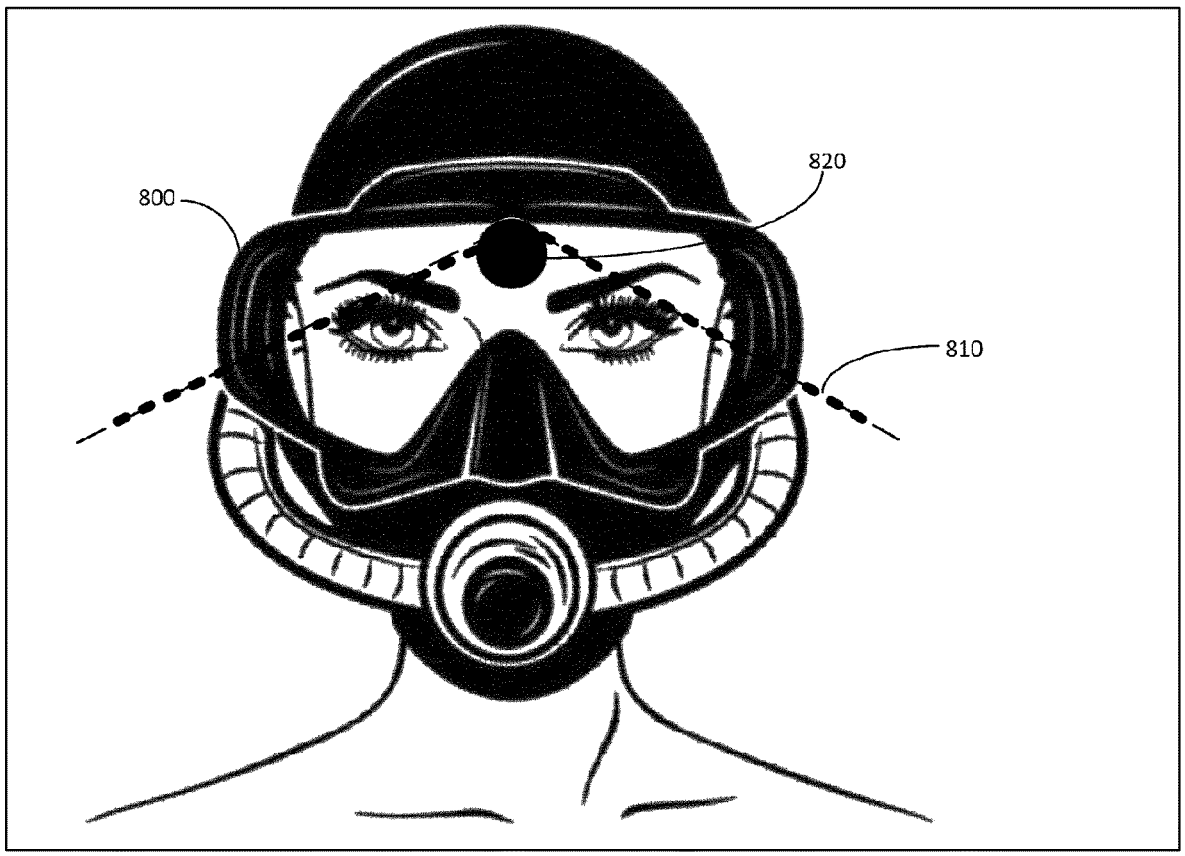
FIG. 8 is a simplified illustration of a diver, wearing a mask which is capable of presenting assisted information on its glass.

In the described scuba-diving scenario, visual information, presented e.g. via a beacon or other arrangement located e.g. at the snorkel, can prove to be sufficient for alerting a dive-buddy, in case the water visibility permits that. Typically, such an arrangement can be in addition to some presentation means, addressing the first diver, who, according to FIG. 8, may have the corresponding information presented e.g. in the form of a color coded symbol 820 on the glass of the diving mask 800, placed within the field of view 810 of the scuba diver. However, in order to be prepared for bad visibility, information may instead be configured to be transmitted wirelessly to the dive-buddy, by having information transmitted e.g. to a watch or any other wrist held wearable, which may provide information visually, audible or haptic, alone or in a combination.

Referring again to FIG. 6, a method adapted for a buddy scenario, such as the one described above, will now be described. Assume that leg strokes are initially monitored, whereas a threshold value set for number of leg strokes per minute is found to be exceeded at step 6:50*a*, thereby triggering an adaptation of biological behavior model, where in this situation such a trigger indicates that the heart rate of the diver need further interrogation, e.g. by either replacing the stroke based biological behavior model to a heart rate based biological behavior model, or by weighting the latter model higher than the former one in step 6:60*a*. If in step 6:50*b* it is determined that also the heart rate exceeds another, respective threshold value, such a trigger may trigger adaptation of a biological behavior model again by replacing or changing the weighting to a higher weight in step 6:60*b*, this time from a heart rate model to a breathing model. Based on the breathing model, the scuba-diver can then be instructed to resume a relaxing breathing pace, according to steps, corresponding to step 5:70 and 5:80 of FIG. 5. While monitored breathing of the scuba diver and considering the breathing model, this threshold value may indicate yet another modification of a biological behavior model in a similar manner as suggested above.

As indicated in the example above, one or more applied biological behavior models may be replaced by others, due to a trigger to change focus during monitoring and guiding of a user, here a scuba-diver. In the given example, monitoring of a first biological parameter, such as e.g. leg strokes, may be followed by measuring a second biological parameter, such as e.g. heart rate. The first and second parameter may be monitored one after each other, in case both parameters are considered equally important, or, in case one of the parameters is considered to be less important, one of the parameters may be executed as long as such measures are found to be within an acceptable interval, whereas, once a threshold value is exceeded, the severity level is risen, resulting in that a more critical biological parameter, such as e.g. heart beat, is instead monitored, or in case both leg strokes and heart beat is continuously monitored, at least heart beats are considered to be more relevant than leg strokes. During the mentioned process, guidance of the scuba-diver naturally also changes character, such that instructions for executing calmer leg strokes are provided until the second threshold value is exceeded, leading to that the previous guidance is replaced by guidance on how to obtain lower hear beat. Thereby a dynamic system is provided where a biological behavior model which is considered to be critical or prioritized at the moment is the basis for or at least the most relevant model for the guidance. Guidance may be presented to the scuba-diver as being in a safe zone, a transition zone or in a critical zone, together with appropriate instructions, provided e.g. audible or visually.

In addition to using the mentioned method in an open water dive, it may be arranged as a VR/AR/XR system, allowing dive-buddies to train for critical situations e.g. in a swimming pool.

A user device capable of executing the method for providing assisted execution of a primary task, according to any of the embodiments disclosed above will now be described in further detail below, wherein the user device may be configured e.g. according to any of FIG. 9 or 10.

According to one aspect, a user device 900a, 900b for providing assisted execution of a primary activity is suggested, wherein the user device 900a, 900b is configured to acquire biological data of a first user, to adapt, based on the biological data, at least one biological behavior model, associated with a sequence of phases, constituting at least one primary phase and a preparatory phase, preceding the primary phase, once a trigger to adapt at least one of the at least one biological behavior model has been detected, and to provide, based on the at least one updated version of the at least one biological behavior model and the acquired biological data, updated guidance on execution of the sequence of phases.

The user device 900a, 900b may be configured to provide the updated guidance to any of a first user of a first used device, and a second user of a second user device.

According to one embodiment, the user device 900a, 900b is configured to base the provided guidance on at least two types of acquired biological data which has been mutually correlated with each other.

The user device 900a, 900b may be configured to acquire biological data comprising one or more of breath, pulse, blood pressure, body temperature, iris analysis, sleep analysis and speech analysis, as well as any related biological parameter which can be monitored on a human body.

The user device 900a, 900b may be configured to, at least partly, base the at least one biological behavior model on historical data associated with execution of the sequence of phases, statistical data associated with execution of the sequence of phases, or a combination of both.

The user device 900a, 900b may be configured to trigger, based on the determining of an anomaly in the acquired biological data. If the user device 900a, 900b is configured to determine an anomaly, it may be configured to determine an anomaly which is based on a divergence of at least part of the biological data, diverging from expected biological data with more than a threshold value. In the latter scenario the user device 900a, 900b may be configured to apply at least one preparatory phase which comprises an activity for guiding a user to reduce the biological data divergence.

The user device 900a, 900b may also be capable of relating biological behavior models to each other, by being configured to adapt the at least one biological behavior model by correlating the acquired biological data with at least one of the at least one biological behavior model and by executing the adapting based on the discrepancy between the correlated data.

The user device 900a, 900b may also be capable of applying a flexible approach towards the threshold values applied by one or more biological behavior model, by being configured to adapt the at least one biological behavior model by adapting at least one threshold value, associated with at least one of the at least one biological behavior mode.

In addition, or alternatively, the user device 900a, 900b may be configured to adapt the at least one biological behavior model by executing one or more of: adding a preparatory sequence to the sequence of phases; removing a preparatory phase of the sequence of phases; adapting the duration of at least one of the at least one preparatory phase; adapting the structure of at least one of the at least one preparatory phase; adapting the biological behavior model based on environmental data captured in the environment of the first user; adapting weights associated with captured biological data to be applied on the at least one biological behavior model; adapting the number of sensors to apply for capturing biological data, required for the at least one biological behavior model, and adapting the one or more sensor types to apply for capturing biological data, required for the at least one biological behavior model.

In order to allow a dynamic approach on applied biological behavior models, the user device 900a, 900b may be configured to adapt the at least one biological behavior model by executing replacing of one biological behavior model with at least one other biological behavior model, complementing one biological behavior model with at least one other biological behavior model, or by executing both, if determined applicable.

The user device 900a, 900b may be configured to provide guidance via one or more different presentation means, which may include one or more of e.g. visual, audible and tactile (including e.g. haptic vibration capable means) presentation means, or any other type of presentation means provided at, or connected to the user device 900a, 900b.

In case the user device 900a, 900b is configured to provide guidance to a user, other than the user of user device 900a, 900b, the user device 900a, 900b may be configured to provide such guidance to such a second user device via suitable wired or wireless communication means.

With respect to the primary activity, executable by the user device 900a, 900b, the user device 900a, 900b may be configured to activate one or more actuators and/or one or more sensors when executing any of a primary activity and a preparatory activity, wherein actuation of an actuator may comprise any of actuating a touch key, a touch pad, a physical button, a joystick or a scrolling wheel, alone or in combination, whereas activation of a sensor may comprise capturing of any of speech, sound, body part movement, heartbeat, pulse or breath frequency, alone or in a combination.

Since execution of the primary activity may require repetitive attempts, before the primary activity is considered to be executed, the user device 900a, 900b may be configured to repeat required steps of a method according to any of the embodiments disclosed herein, until the primary activity is considered to have been executed.

Figure 9:
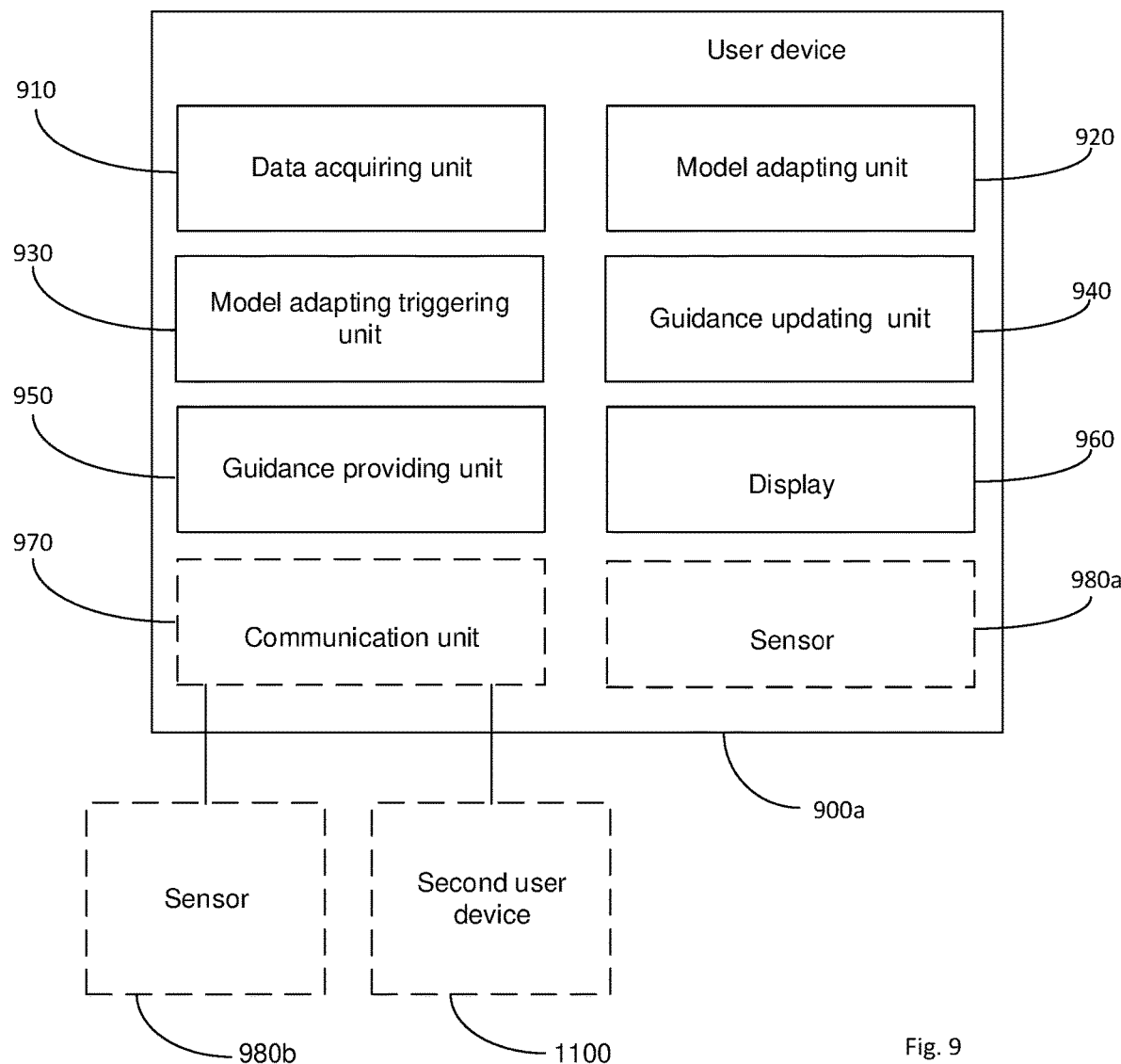
FIG. 9 is a simplified illustration of a user device capable of providing assisted information, configured according to one embodiment.

Referring to FIG. 9 this figure is an illustration of a user device, according to any of the embodiments disclosed above, according to one possible aspect, where the user device 900a comprises a data acquiring unit 910, configured to acquire biological data of a first user, corresponding to step 5:20 of FIG. 5. A model adapting unit 920 is configured to adapt, based on the biological data, at least one biological behavior model, associated with of a sequence of phases, constituting at least one primary phase and a preparatory phase preceding the primary phase, upon detecting, by a model adapting triggering unit 930, a trigger to adapt at least one of the at least one biological behavior model, corresponding to step 5:60 and 5:50, respectively, of FIG. 5. A guidance providing unit 950 is configured to provide, based on the at least one updated version of the at least one biological behavior model and the acquired biological data, updated guidance on execution of the sequence of phases, to e.g. a display, after which the at least one updated version of the at least one biological behavior model has been updated by a guidance updating unit 960, corresponding to steps 5:80 and 5:70, respectively, of FIG. 5. The user device 900a typically also comprises a display (not shown), which can be used for rendering visual guidance, and may also comprise a communication unit 970, in case the user device 900a is capable of providing guidance also to a second user device 1100, other than user device 900a. User device 900a is capable of acquiring biological data and optionally also other types of data from one or more internal sensors 980a, external sensors 980b, or from a combination of both.

Figure 10:
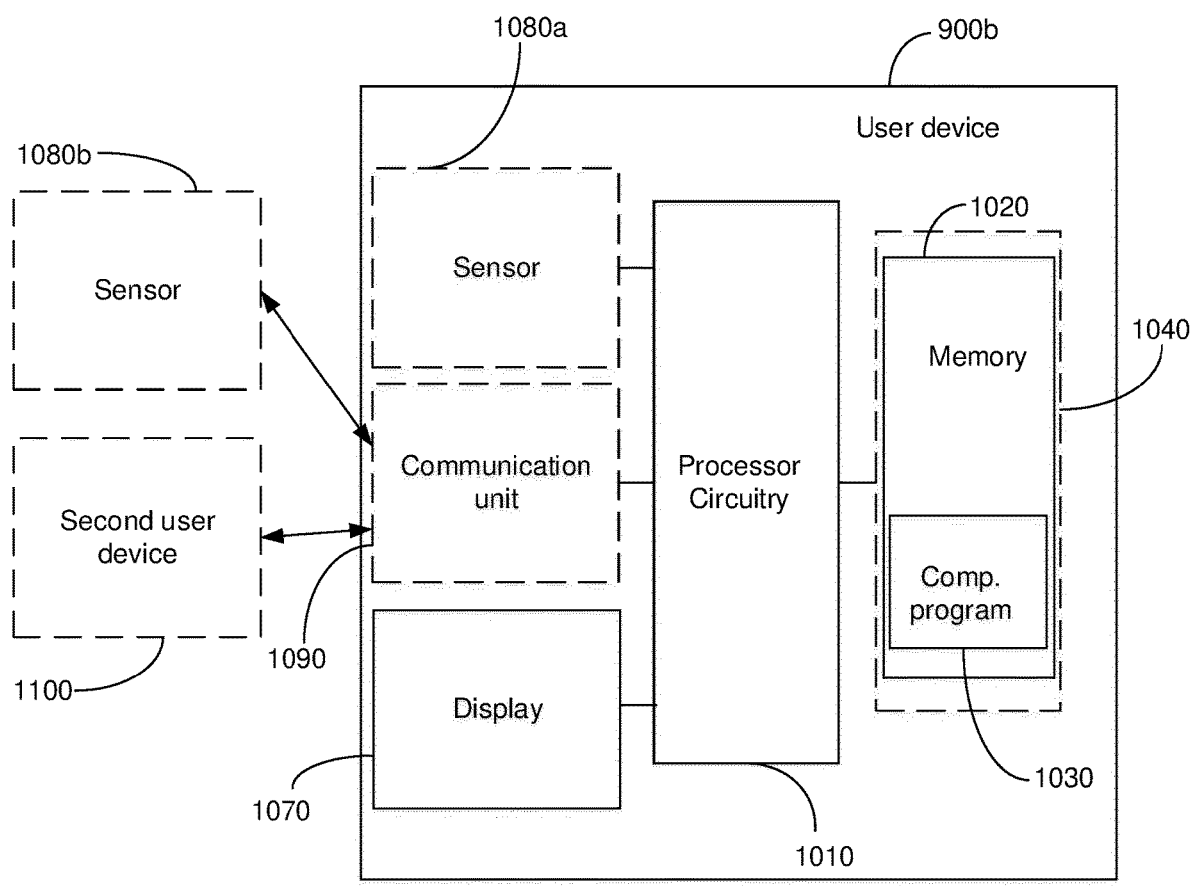
FIG. 10 is a simplified illustration of a user device capable of providing assisted information, configured according to another embodiment.

According to yet another aspect, a user device 900b may be configured and described according to FIG. 10, where the user device 900b comprise processor circuitry 1010, and a memory 1020, comprising executable instructions, which may also be referred to as a computer program 1030, which when executed by the processing circuitry 1010, causes the processing circuitry 1010 to execute the method according to any of the embodiments described above with reference to FIGS. 5 and 6. Also user device 900b typically comprises a display (not shown), capable of rendering visual assistance or guidance and is accessible to one or more sensors 1080a, which may be incorporated into the user device 900b, or one or more sensors 1080b, which are accessible to user device 900b, or to a combination of both categories of sensors. User device 900b may comprise a communication unit 1090, enabling the user device 900b to communicate with the one or more external sensors 1080b, and/or a second user device 1100, other than user device 900b. User device 900b may also comprise a computer program product 1040, on which at least part of the mentioned memory 1040 and the computer program 1030 is stored.

Although not explicitly shown if any of FIG. 9 or 10, any of user device 900a, 900b, may also comprise, be connected to or be accessible to one or more actuators, as described herein.

The memory 1020 can be any combination of random access memory (RAM) and/or read only memory (ROM). The memory 1020 also typically comprises persistent storage, which, for example, can be any single one or combination of magnetic memory, optical memory, solid-state memory or even remotely mounted memory. The processing circuitry 1010 may comprise e.g. one or more central processing unit (CPU), multiprocessor or digital signal processor (DSP), or a combination thereof.

The computer readable instructions, configured to provide the functionality as described herein may be provided as a computer program 1030, in the form of a computer program product 1040, where the computer program product may be e.g. an optical disc, such as a Compact Disc (CD), a Digital Versatile Disc (DVD) or a Blu-Ray disc.

Further functional units which are normally acquired in a user device, capable of operating as suggested herein, such as e.g. an antenna unit, which are not necessary for the understanding of the functionality as suggested herein, have been omitted for simplicity reasons.

The invention claimed is:

1. A method at a user device for repeated assisted executions of a primary activity, wherein the method comprises:
acquiring, using at least one sensor configured to be affixed to a first user, biological data of the first user;
adapting, based on the biological data, at least one biological behavior model, associated with a sequence of phases, constituting at least one primary phase, modeling the first user's behavior during execution of the primary activity, and a preparatory phase preceding the primary phase, the preparatory phase modeling the first user's preparatory behavior, prior to the execution of the primary activity, upon detecting a trigger to adapt at least one of the at least one biological behavior model; and
presenting, in real time or near real time, by rendering a visual overlay on a display device, based on the at least one adapted version of the at least one biological behavior model and the acquired biological data, updated guidance on execution of the sequence of phases to the first user, guiding the first user on how to follow the sequence of phases when, and prior to, performing execution of the primary activity.

2. The method according to claim 1, wherein the updated guidance is provided to at least one of the user device of the first user and a user device of a second user.

3. The method according to claim 1, wherein the provided guidance is based on at least two types of acquired biological data, which has been mutually correlated with each other.

4. The method according to claim 1, wherein the biological data comprises at least one of: breath, pulse, blood pressure, body temperature, iris analysis, sleep analysis and speech analysis.

5. The method according to claim 1, wherein the at least one biological behavior model is at least partly based on at least one of:
historical data associated with execution of the sequence of phases, and
statistical data associated with execution of the sequence of phases.

6. The method according to claim 1, wherein the trigger is based on the determining of an anomaly in the acquired biological data.

7. The method according to claim 6, wherein the anomaly is based on a divergence of at least part of the biological data, diverging from expected biological data with more than a threshold value.

8. The method according to claim 7, wherein the preparatory phase comprises an activity for guiding a user to reduce the biological data divergence.

9. The method according to claim 1, wherein the adapting of the at least one biological behavior model comprises correlating the acquired biological data with at least one of the at least one biological behavior model and executing the adapting based on the discrepancy between the correlated data.

10. The method according to claim 1, wherein the adapting of the at least one biological behavior model comprises adapting at least one threshold value, associated with at least one of the at least one biological behavior model.

11. The method according to claim 1, wherein the adapting of the at least one biological behavior model comprises at least one of:
   adding a preparatory sequence to the sequence of phases;
   removing a preparatory phase from the sequence of phases;
   adapting the duration of a at least one of the at least one preparatory phase;
   adapting the structure of at least one of the at least one preparatory phase;
   adapting the biological behavior model based on environmental data captured in the environment of the first user;
   adapting weights associated with captured biological data to be applied on the at least one biological behavior model;
   adapting the number of sensors to apply for capturing biological data required for the at least one biological behavior model; and
   adapting one or more sensor types to apply for capturing biological data required for the at least one biological behavior model.

12. The method according to claim 1, wherein the adapting of the at least one biological behavior model comprises at least one of:
   replacing one biological behavior model with at least one other biological behavior model, and
   complementing one biological behavior model with at least one other biological behavior model.

13. The method according to claim 1, wherein the guidance is provided via at least one of visual, audible and tactile presentation means.

14. The method according to claim 1, wherein the guidance is provided to a second user device via wireless communication means.

15. The method according to claim 1, wherein at least one of the primary activity and the at least one preparatory activity comprises at least one of activating an actuator and a sensor.

16. The method according to claim 14, wherein the actuator comprises at least one of a touch key, a touch pad, physical button, a joystick and a scrolling wheel.

17. The method according to claim 14, wherein the sensor is at least one of a sensor capable of capturing speech, sound, body part movement, heartbeat, pulse and breath frequency.

18. A user device for providing repeated assisted execution of a primary activity, wherein the user device is configured to:
   acquire, using at least one sensor configured to be affixed to a first user, biological data of the first user;
   adapt, based on the biological data, at least one biological behavior model, associated with of a sequence of phases, constituting at least one primary phase, modeling the first user's behavior during execution of the primary activity, and a preparatory phase preceding the primary phase, the preparatory phase modeling the first user's preparatory behavior, prior to the execution of the primary activity, upon detecting, by a model adapting triggering unit a trigger to adapt at least one of the at least one biological behavior model; and
   present, in real time or near real time, by rendering a visual overlay on a display device, based on the at least one adapted version of the at least one biological behavior model and the acquired biological data, updated guidance on execution of the sequence of phases to the first user, guiding the first user on how to follow the sequence of phases when, and prior to, performing execution of the primary activity.

19. The user device according to claim 18, wherein the user device is configured to provide the updated guidance to at least one of the user device of the first user and a second user device of a second user.

20. A computer program product comprising a non-transitory computer readable medium storing a computer program comprising instructions, which when executed by processing circuitry of a user device, causes the user device to perform the method according to claim 1.

* * * * *